United States Patent [19]
Gilberti

[11] Patent Number: 5,784,932
[45] Date of Patent: Jul. 28, 1998

[54] ROTARY INDEXING TABLE

[76] Inventor: Joseph J. Gilberti, 98 Cotswold Way, Avon, Conn. 06001

[21] Appl. No.: 668,445

[22] Filed: Jun. 20, 1996

[51] Int. Cl.⁶ .................................................. B23Q 16/02
[52] U.S. Cl. .................... 74/813 R; 108/22; 474/205
[58] Field of Search .................... 74/813 R, 813 C, 74/816; 108/22, 20, 139; 474/205, 204, 202, 148, 150

[56] References Cited

U.S. PATENT DOCUMENTS

| | | | |
|---|---|---|---|
| 1,517,417 | 12/1924 | Floyd | 108/20 |
| 1,732,113 | 10/1929 | Van Der Meer | 108/139 X |
| 4,066,943 | 1/1978 | Roch . | |
| 4,353,271 | 10/1982 | Pieczulewski . | |
| 5,149,043 | 9/1992 | Grundmann | 108/20 X |
| 5,159,846 | 11/1992 | Warner . | |
| 5,170,678 | 12/1992 | Wawrzyniak et al. . | |
| 5,240,746 | 8/1993 | O'Connell Litteral . | |
| 5,247,733 | 9/1993 | Kubota et al. . | |
| 5,313,882 | 5/1994 | Karlyn et al. . | |
| 5,335,594 | 8/1994 | Karlyn et al. . | |
| 5,370,745 | 12/1994 | Litteral . | |
| 5,450,771 | 9/1995 | Carter et al. . | |

FOREIGN PATENT DOCUMENTS

| | | | |
|---|---|---|---|
| 117425 | 4/1930 | Austria | 108/139 |
| 645705 | 10/1928 | France | 108/139 |
| 2512659 | 3/1983 | France | 108/139 |
| 1300809 | 8/1969 | Germany | 74/813 R |
| 604067 | 4/1960 | Italy | 108/139 |
| 4046737 | 2/1992 | Japan | 74/813 R |

*Primary Examiner*—Charles A. Marmor
*Assistant Examiner*—Mary Ann Battista
*Attorney, Agent, or Firm*—Alix, Yale & Ristas, LLP

[57] ABSTRACT

A rotary indexing table has a table defining a flat table surface. A dial having an upper surface and a lower surface is positioned over and generally parallel to the table surface. The dial further defines a circular inner edge and an outer edge. First bearings mounted to the table surface engage the inner edge of the dial to radially support the dial on the table. Second bearings axially support the lower surface on the table surface for rotation. The second bearings comprise circular grooves in the lower surface of the dial and concentric with the inner edge. Ball bearings are in the grooves and in contact with the flat table surface. A drive assembly comprising a belt engaging the outer edge and driven by a motor indexes the rotation of the dial.

25 Claims, 5 Drawing Sheets

ROTARY INDEXING TABLE

BACKGROUND OF THE INVENTION

This invention relates generally to indexers for automated operations. More particularly, the present invention relates generally to a rotary indexing table.

Rotary indexing tables are well-known for the accurate positioning of workpieces at work stations for automated operations. Rotary indexing tables typically have a table and a dial rotatably mounted thereon. An indexer assembly rotates the dial through a predetermined angle for positioning workpieces for sequential automated operations.

Rotary indexing tables have been successfully employed in the field of automated assembly for work stations including pick and place devices, feeder bowls, visual inspections, label applicators, robot arms, adhesive applicators, laser machining and other automated assembly processes. Rotary indexing tables are further well-known in the fields of machining for the accurate positioning of workpieces to receive drilling, boring, tapping, CNC machining, facing, grinding, and other types of machining processes. Other uses for rotary indexing tables include the accurate positioning of workpieces for coating, sterilizing, cleaning, testing and calibrating.

More recently, rotary indexing tables have been used in the decorating field for screen printing, hot stamping, pad printing, ink jet printing, impact marking, laser marking, spray painting and other decorative processes. For example, rotary indexing tables are currently employed for multicolor screen printing onto workpieces such as CD's, credit cards, key fobs, etc. Typically, the dial of a rotary indexing table supports multiple, equidistantly positioned fixtures. The fixtures receive and support the workpieces during the printing operations. At a first work station, a workpiece is automatically positioned onto the fixture. The dial then rotates through a precise angle or distance to position the workpiece under a first screen printing apparatus. After the printing is completed, the dial rotates through the same angle again to position the workpiece for receiving a second overlaying screen print image. The indexing process continues until the workpiece has received all the required layers of screen printing and is removed from the fixture at a final work station.

Automated apparatus forming work stations for operating on workpieces positioned to the dial are typically mounted outside the circumference of the dial and are oriented radially inward toward the workpieces on the dial. The position of the automated work stations outside the circumference of the dial can result in excessively large and crowded assemblies of the rotary indexing table and the accompanying equipment. Furthermore, as the number of work stations surrounding a particular dial increases, space for additional work stations can only be provided by increasing the radius of the dial.

Increases in dial size can result in wasted space at the central portion of the dial, and inertial problems in starting and stopping the dial due to the high moment of inertia of the radially outer portion of the dial. Furthermore, the dial is typically indexed from a central position, typically the spindle on which the dial rotates. As dial size increases, inaccuracies in the indexed angle are amplified by the increased radius of the dial. In addition, for some automated operations, the automated work station is oriented vertically above the fixture and workpiece. Therefore the automated work stations are required to be cantilevered over the dial surface, which can lead to motion of the work station and decreased accuracy of the automated procedure.

Conventional hollow rotary indexing tables overcome some of the above discussed deficiencies of conventional rotary indexing tables by defining an opening or hollow on the inside of the dial to allow the mounting of work station equipment on the central portion of the indexing table. However, these hollow rotary indexing tables are typically very expensive. Hollow indexers typically require massive castings and many high-precision parts throughout leading to increased manufacturing costs. Furthermore, due to the engineering costs for designing indexers of different radii, hollow rotary indexing tables are typically available in a relatively limited number of sizes. In addition, hollow indexers are usually constructed to perform only a limited predetermined number of indexes per revolution due to the mechanical movement of the indexer assembly.

Furthermore, as the dial size increases on conventional rotary indexing tables and conventional hollow indexers, the dial tends to overhang the indexer assembly resulting in increased inaccuracy. Small variations in the angle determined by the indexer assembly are amplified by the increased radius of the dial to result in imprecise positioning of the workpiece. Additionally, for hollow rotary indexing tables of increased size, the large mass of the dial requires increased size motors to accelerate and decelerate the large inertial masses associated with the dial. These large masses tend to increase the time for a given cycle for the dial to move between index positions and therefore can result in decreased throughput rate and productivity.

SUMMARY OF THE INVENTION

Briefly stated, the invention in a preferred form is a hollow ring rotary indexing table. The rotary indexing table of the invention has a horizontally oriented table surface machined for flatness. A precision machined ring or dial is positioned over the table surface. The dial is preferably a flattened annular ring having an upper work surface and an opposite lower bearing surface. The dial further defines a circular precision ground or machined inner edge and an outer edge. The inner edge is preferably machined to define a bevel oriented away from the table surface.

The dial is axially supported on the table surface by inner and outer thrust bearings. The inner and outer thrust bearings resist vertical loads on the dial. The inner and outer thrust bearings preferably comprise inner and outer bearing grooves machined in the lower surface of the dial. The bearing grooves are preferably concentric with the inner edge of the dial and have a semicircular cross section. Ball bearings are positioned in the grooves and in contact with the flat table surface. The bearing grooves define the upper races of the thrust bearings and the flat table surface defines the lower races of the thrust bearing. The thrust bearings resist vertical loads and permit smooth rotation of the dial. However, due to the lower races being flat, the thrust bearings provide essentially no horizontal positioning of the dial and therefore allow the dial to move horizontally or "float" on the table surface.

A plurality of roller bearings are mounted in contact with the inner edge of the dial to define the rotational movement of the dial. The roller bearings have beveled faces for surface-to-surface contact with the bevel of the inner edge of the dial. The roller bearings further prevent horizontal motion of the dial on the table surface. Because the thrust bearings provide minimal horizontal positioning, the entire rotation of the dial is defined by the contact of the roller bearings on the precisely machined inner edge of the dial. Therefore any lack of concentricity of the thrust bearing grooves relative to each other or the inner edge does not effect precise rotation of the dial.

A drive assembly rotates the dial on the table. A geared pulley, driven by a servo motor, is positioned generally in the plane of the dial. A continuous toothed belt having a longitudinal groove, engages the pulley and wraps around substantially the entire circumference or outer edge of the dial. The teeth of the belt engage the toothed pulley and the longitudinal groove engages the outer edge of the dial.

A motor controller controls the speed of the motor to rotate the dial. The motor controller is preferably a programmable computer based device, such as a personal computer. The motor controller is programmable to operate the servo motor to provide a variety of operational cycles comprising different index positions and cycle rates.

The motor controller initiates an indexing cycle by signaling the servo motor to begin rotation and therefore accelerating the dial. The servo motor provides a feed-back signal that precisely indicates the amount of rotation of the motor. From the motor feed-back signal the motor controller calculates the rotation of the dial. In a simplified application, the motor controller counts pulses from the servo motor until a predetermined number have been received, therefore indicating the dial has been rotated the predetermined amount. As the dial approaches the predetermined amount of rotation as indicated by the motor feed-back signal, the motor controller signals the motor to decelerate and therefore the motor decelerates the dial. When the dial reaches the index position, as calculated from the servo motor feed-back signal, the motor controller signals the motor to stop. This operating procedure provides a smooth fast sinusoidal or cam-like motion of the dial between indexing positions. The motor controller then waits for an operator signal or an automated predetermined time delay before initiating another indexing cycle.

An indexing assembly having a sensor assembly and an index mark on the dial provides a precise indication of the position of the dial for the motor controller. The index assembly generates a position signal to the motor controller. The motor controller employs the position signal to determine dial position and therefore calculate the index positions. The sensor assembly preferably comprises a photo source and a photo sensor to sense the position of an index mark on the dial. The photo sensor generates the position or indexing signal to the motor controller indicative of the index mark position.

In a further embodiment of the invention, a plurality of indexing marks comprising indexing posts are provided adjacent the beveled edge of the dial. A photo source and photo sensor are mounted the table to sense positions of the index posts. Each indexing post indicates a particular indexing position. During an indexing cycle, the motor controller signals the motor to decelerate as the dial approaches an indexing position. However, the motor is signalled to finally stop only after the photo sensor senses the location of an indexing post and signals the motor controller. Therefore, the indexing posts, which can be precision positioned to less than a thousandth of an inch, precisely control each indexing position for improved indexing accuracy.

An object of the invention is to provide a rotary indexing table requiring a small number of components.

Another object of the invention is to provide a rotary indexing table having a large unobstructed open central area.

A further object of the invention is to provide a rotary indexing table requiring a minimum number of precision machined components yet capable of precision operation.

Another object of the invention is to provide a rotary indexing table having high-precision indexing at a low cost.

A further object of the invention is to provide a rotary indexing table capable of being manufactured in a variety of particularly large sizes.

Another object of the invention is to provide a rotary indexing table having a large diameter in combination with a moderate inertial mass.

Other objects and advantages of the invention will become apparent from the drawings and the specification.

DETAILED DESCRIPTION OF THE PREFERRED EMBODIMENT

Figure 1:
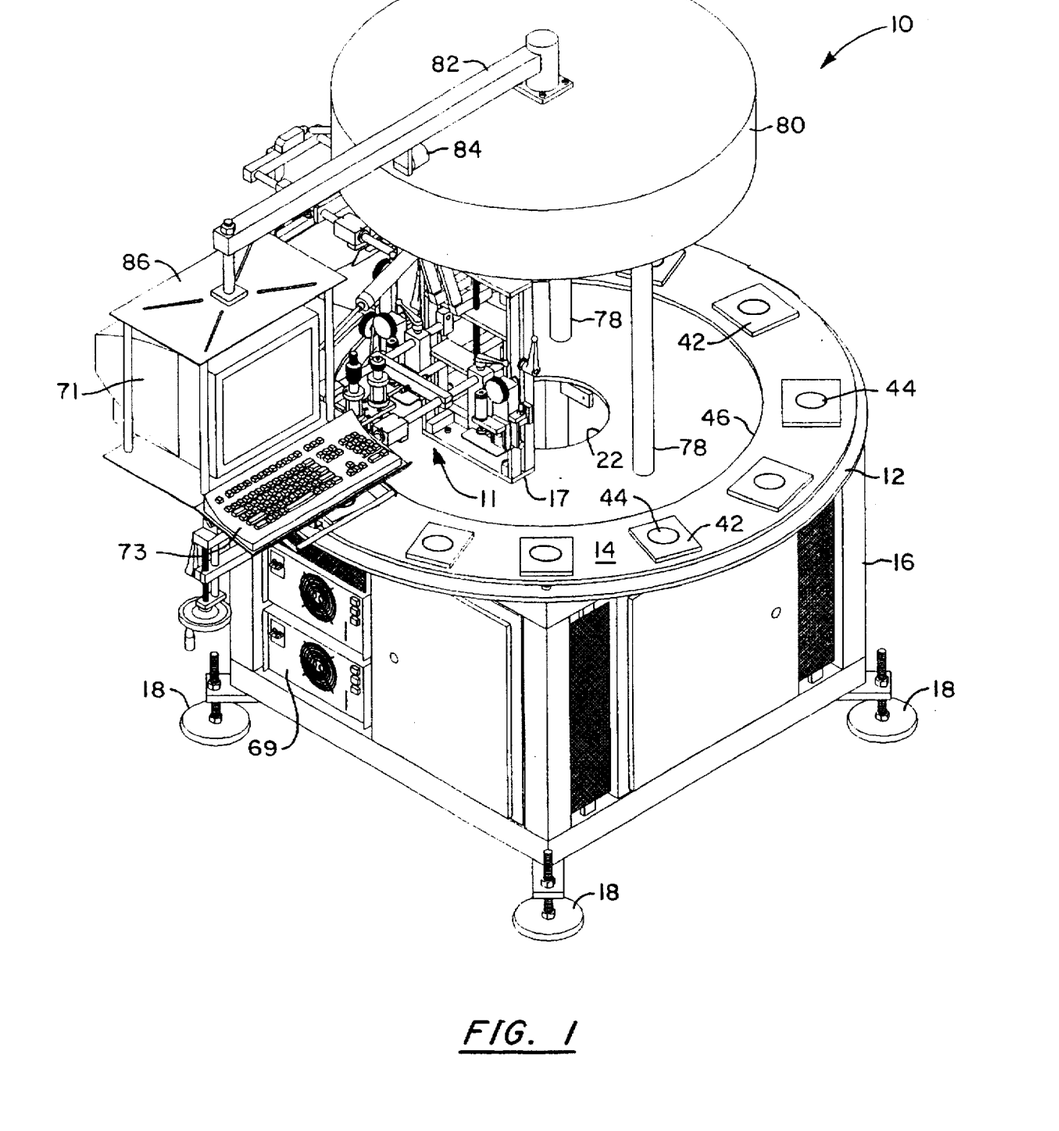
FIG. 1 is a perspective view of a rotary indexing table and an associated automated work station in accordance with the invention.
Figure 2:
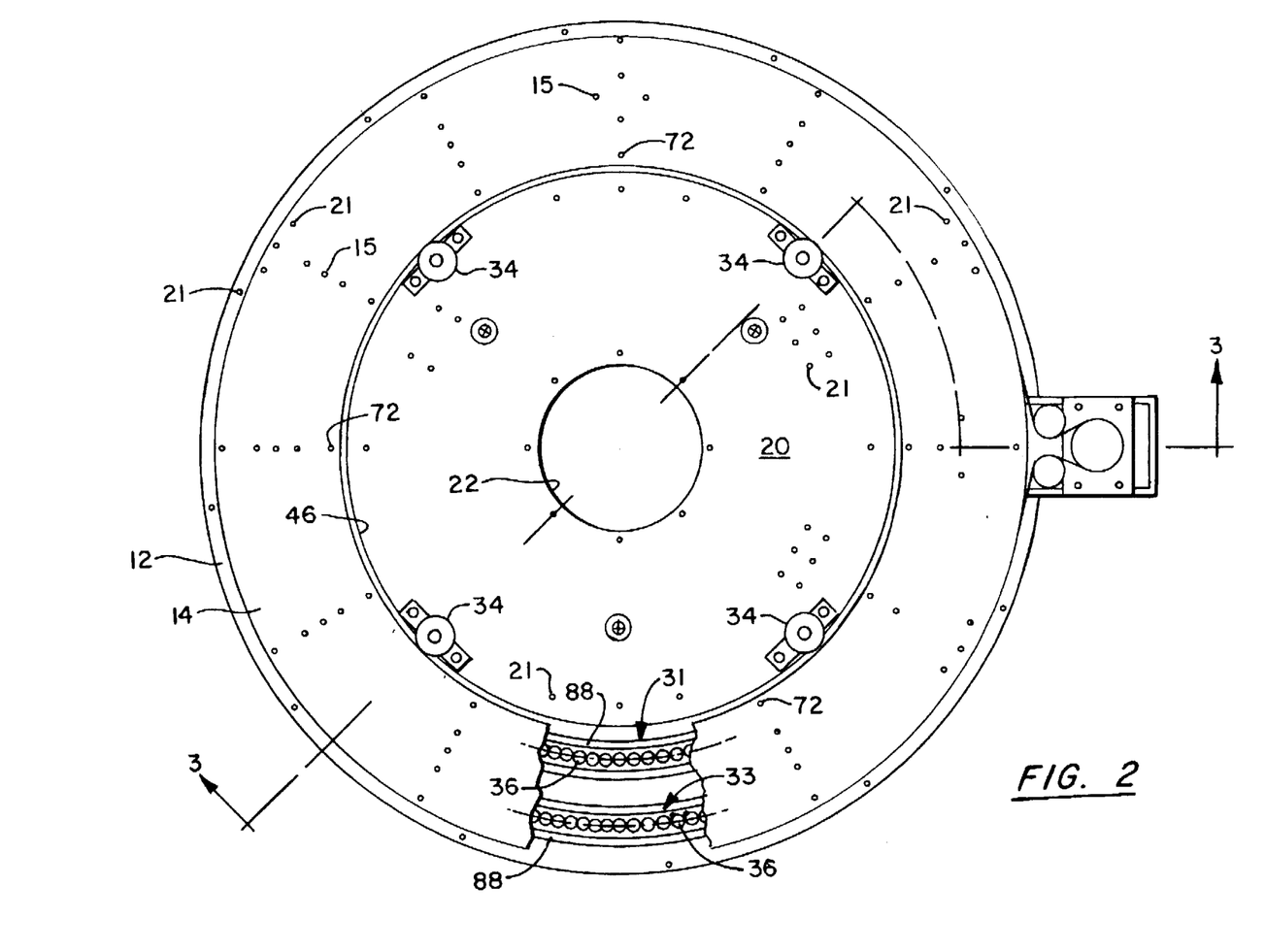
FIG. 2 is a top view, partially in phantom, of the table, dial and drive assembly of the rotary indexing table of FIG. 1.
Figure 3:
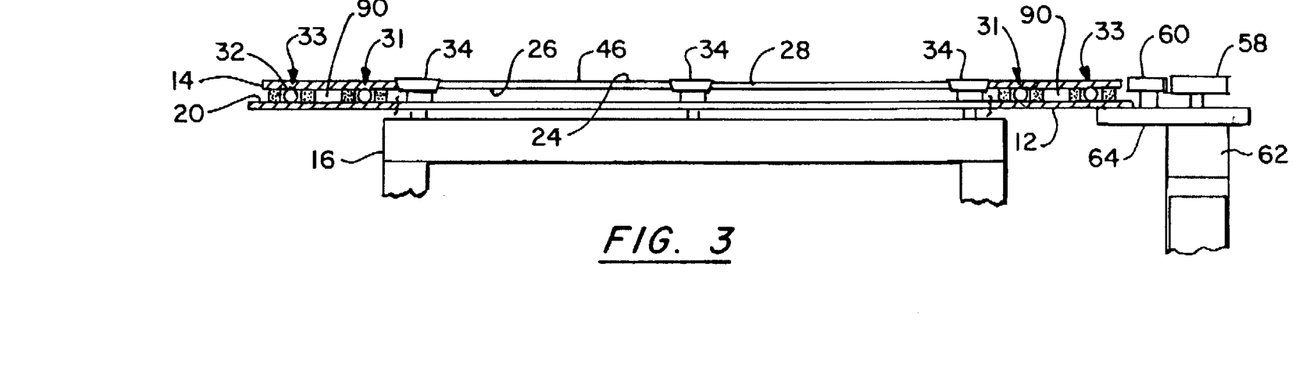
FIG. 3 is a fragmentary, cross-sectional view of the table, dial, drive assembly and cabinet of FIG. 2 taken along the line 3—3.

With reference to FIGS. 1 to 3, wherein like numerals represent like components throughout the figures, a rotary indexing table in accordance with the invention is generally designated by the numeral 10. Mounted at 17 to the indexing table 10, is an automated work station 11 for automated assembly, machining, decorating or other automated operations on workpieces.

The rotary indexing table 10 has a table 12 and a dial 14 rotatably mounted thereon. The table 12 is a blanchard ground steel plate. This grinding process is relatively low-cost to obtain flatness of the table surface 20 within plus or minus two thousandths of an inch. The table surface 20 is preferably machined with pluralities of standard patterns of mounting openings 21 for the simplified and rapid changeover or replacement of automated work stations 11. The table 12 can be readily manufactured to provide a rigid and stable low cost support for the dial 14 and work stations 11. The table 12 is mounted on a base 16 having levelers 18 for horizontally leveling of the table 12. Electrical, air, hydraulic and other cables, to supply the automated work stations machinery 11 mounted to the table surface 20, extend through a central access opening in the table 12.

Rotatably mounted on the table 12 is the plate-like annular ring or dial 14. The dial 14 has an upper work surface 24 and an opposite lower bearing surface 26. The dial 14 is preferably manufactured from conventional readily available steel or aluminum plate for reduced cost relative to custom cast components. The dial 14 is precision machined on conventional CNC machinery to define a precision ground circular inner edge 28 and outer edge 38. The inner edge 28 defines a dial opening 46 allowing access to the table surface 20. Fixture mounting openings 15 are machined in the work surface 24 at precise index positions for the mounting of fixtures 42 to the dial 14. The fixtures 42 support workpieces 44 for operation thereon by the work stations 11.

Figure 9:
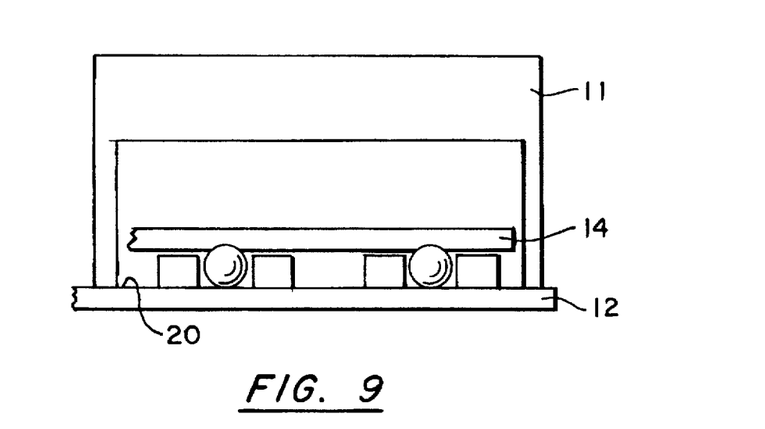
FIG. 9 is an enlarged, partly schematic, fragmentary view of the table, dial and drive assembly of FIG. 3 with an associated work station.

In the preferred embodiment, at least one automated work station 11 is mounted to the table surface 20 through the dial opening 46. The work station 11 is oriented toward the dial for operating on workpieces 44 mounted thereto. The table 12 preferably projects outside the outer edge 38 of the dial 14 to allow the automated work station 11 to be mounted simultaneously inside and outside the dial 14. (See FIG. 9) The automated work station 11 therefore bridges or straddles the dial 14 and is more rigidly positioned for improved operational accuracy. Furthermore, mounting the automated work station 11 directly to the table surface 20 eliminates the requirement for additional machining or weldments that would increase costs or complexity of the rotary indexing table 10.

Figure 4:
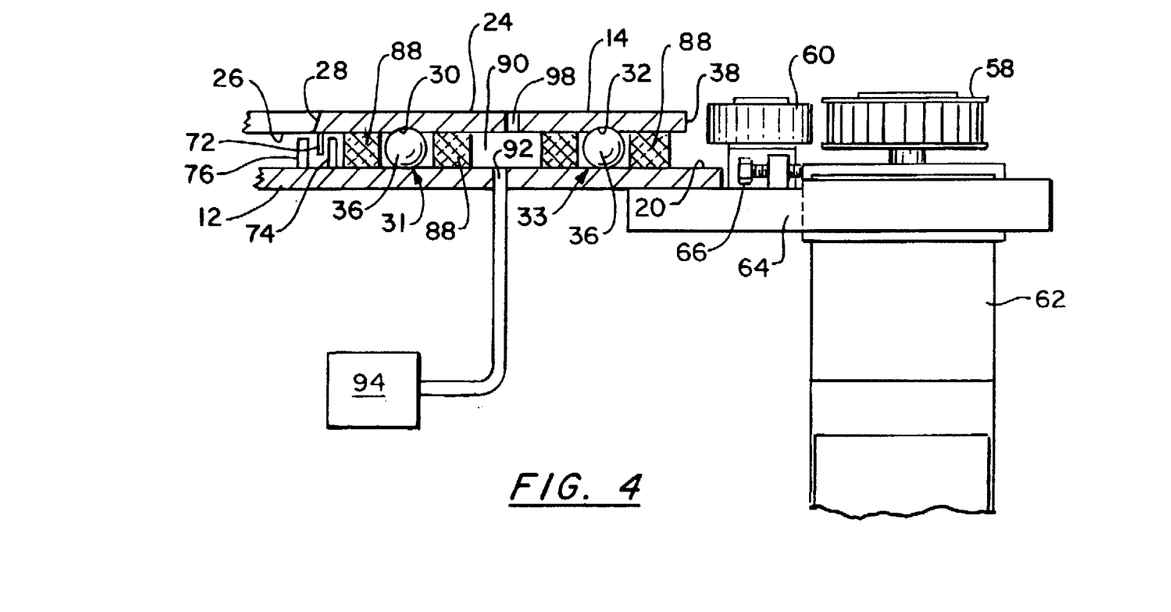
FIG. 4 is an enlarged, fragmentary view of the table, dial and drive assembly of FIG. 3.

An inner bearing groove 30 and an outer bearing groove 32 are machined in the bottom surface 26 of the dial 14 concentrically with the inner edge 28. (See FIGS. 2 and 4) The inner and outer bearing grooves 30, 32 are preferably machined in the same machining set up as the inner edge 28 for improved concentricity. The inner and outer bearing grooves 30, 32 each have a semi-circular cross-section for receiving ball bearings 36 positioned between the inner and outer bearing grooves 30, 32 and the flat table surface 20. The table surface 20, inner and outer bearing grooves 30, 32 and ball bearings 36 define inner and outer thrust bearings 31, 33 that support vertical loads on the dial 14 as the dial 14 rotates relative to the table 12. The bearing grooves 30, 32 define the upper races for the thrust bearings 31, 33 and the flat table surface 20 defines the lower races for the thrust bearings 31, 33.

The bearing grooves 30, 32 are preferably provided in the dial 14.

However, the bearing grooves can alternately be machined into the table surface 20 and the ball bearings in the grooves of the table surface therefore act against a flat lower surface on the dial. However, in the preferred embodiment, the bearing grooves 30, 32 are defined the dial 14 so the bearings will be self-cleaning. During rotation of the dial 14 on the table 12, dirt particles and other contaminants will fall from the downwardly oriented grooves 30, 32.

The ball bearings 36 are preferably formed of conventional precision molded polymers, such as nylon, delrin, or polyethylene for reduced cost and improved performance. Polymer ball bearings do not require lubrication for prolonged periods of use, and therefore the thrust bearings 31, 33 require reduced maintenance. Furthermore, the use of a polymer for the ball bearings 36 reduces wear of the precision machined inner and outer bearing grooves 30, 32 in the dial 14. In addition, the ball bearings 36 will not generally wear grooves into the table surface 20 from long term operation of the indexing table 10. Grooves worn in the table surface 20 by the ball bearings 36 would affect smooth and precise rotation of the dial 14. The large numbers of ball bearings 36 allow the polymer ball bearings to support substantial loads on the dial 14. Additional concentric thrust bearings can be provided for heavier dials or loads.

Preferably, the thrust bearings 31, 33 provide no radial positioning of the dial 14 on the table surface 20.

Furthermore, the thrust bearings 31, 33 also do not horizontally position the dial 14 on the table surface 20. The use of at least one set of flat races for the thrust bearings 31, 33 permits the dial 14 to move freely horizontally or "float" on the table surface 20.

Figures 5, 6, 7:
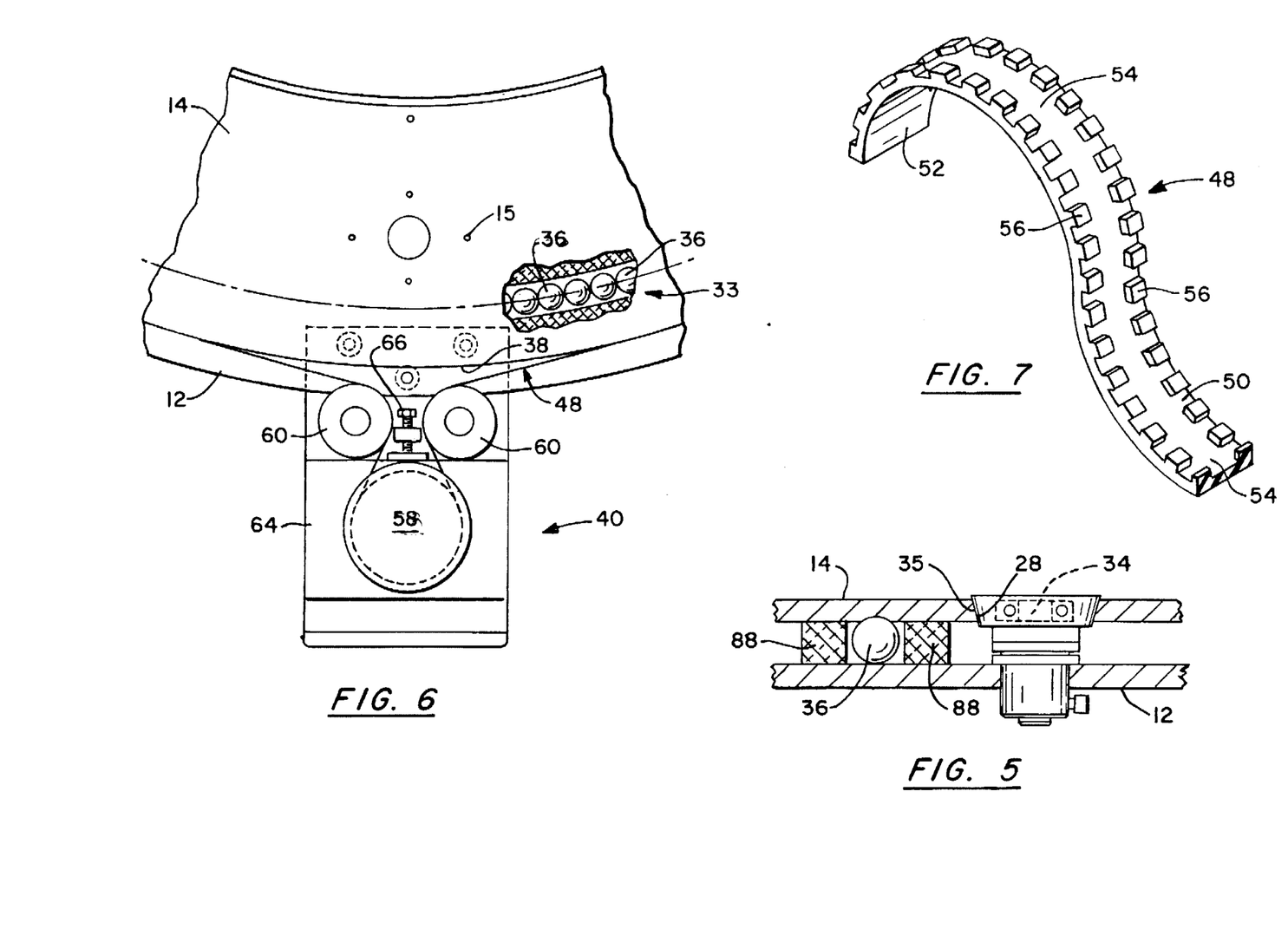
FIG. 5 is an enlarged, fragmentary top view of the table, dial and roller bearing of FIG. 3.
FIG. 6 is an enlarged, fragmentary view of the table, dial and drive assembly of FIG. 2.
FIG. 7 is a fragmentary, perspective view of the belt of FIG. 6.

A plurality of roller bearings 34 contacting the inner edge 28 of the dial 14 provide horizontal and rotational positioning of the dial 14 on the table 12. (See FIG. 5) The roller bearings 34 are fixed to the table surface 20 within the dial opening 46. The inner edge 28 of the dial 14 is preferably angled to define a bevel oriented away from the table surface 20. The roller bearings 34 have beveled faces 35 congruent to the bevel of the inner edge 28 for surface-to-surface contact between the roller bearing 34 and inner edge 28 as the dial 14 rotates on the table 12. The contact of the beveled faces 35 of the roller bearings 34 against the beveled inner edge 28 further results in a vertical downward thrust force to hold the dial to the table 12. A preferred angle of 75° from horizontal for the bevel on the inner edge has been found to provide adequate downward thrust without excessive wear between the roller bearings 34 and the inner edge 28.

Preferably four roller bearings 34 are positioned equidistantly around the inner periphery of the dial 14 and in contact with the inner edge 28 to fix the dial 14 horizontally and define the rotational motion of the dial 14 on the table 12. (See FIGS. 2 and 3) As indicated above, the thrust bearings 31, 33 preferably allow the dial 14 to move freely horizontally on the table surface 20. Therefore, as the dial rotates on the roller bearings 34, any lack of concentricity of the bearing grooves 30, 32 will not develop radial thrust against the dial 14 and the roller bearings 34 to affect accurate and smooth rotation of the dial 14.

The roller bearings 34 are preferably flush with the upper surface 24 of the dial for minimal interference between the roller bearings 34 and the automated work stations 11. (See FIG. 5) Furthermore the roller bearings 34 cover only a small portion of the table surface 20 inside the dial opening 46 leaving additional space for the mounting of automated work stations.

In an alternate embodiment, roller bearings having conventional perpendicular roller surfaces (not shown) are angled upward from the table surface 20 to be in surface-to-surface contact with the beveled inner edge 28 of the dial 14. However, the angled roller bearing projects above the plane of the upper surface of the dial and can interfere with the automated work stations mounted to the table surface.

In still another embodiment (not shown), the inner edge of the dial 14 is machined to be generally orthogonal to the table surface 20. A roller bearing assembly having a horizontal roller and a vertical roller positions the dial horizontally and rotatably. The horizontal roller is in rolling contact with the perpendicular inner edge of the dial 14 and the perpendicular roller is in rolling contact with the upper work surface 24 adjacent the inner edge 28. Again however, the projecting perpendicular roller bearing could interfere with work station apparatus mounted to the table surface 20.

It should be recognized that although the above described table, dial and bearings have particular usefulness with regard to indexing, they can also be employed for continuous rotational operation.

A drive assembly 40 engages against the outer edge 38 of the dial 14 to rotate the dial 14 relative to the table 12. (See FIGS. 4 and 6) The outer edge 38 of the dial is preferably machined concentric to the inner edge 28 and perpendicular to the upper and bottom surfaces 24, 26. The drive assembly 40 employs a belt 48, engaging substantially the entire outer edge 38 of the dial 14, to rotate the dial 14 relative to the table 12.

The belt 48 preferably defines a toothed side 50 and an opposite smooth side 52. (See FIG. 7) The linear central portion of the toothed side 50 of the belt 48 is routed away to provide a smooth longitudinal central groove 54 between opposite teeth 56 for contact with the outer edge 38 of the dial 14. The width of the longitudinal central groove 54 is preferably generally equal to the thickness of the dial 14. In use, the teeth 56 on the edges of the belt 48 engage a geared pulley 58, while the longitudinal central groove 54 engages by surface to surface contact the outer edge 38 of the dial 14. Furthermore, the teeth 56 extend radially inward over the upper and lower surfaces 24, 26 of the dial 14 to vertically maintain the belt 48 on the outer edge 38 of the dial 14. The large surface-to-surface contact between the longitudinal central groove 54 of the belt 48 and the outer edge 38 of the dial 14 results in very minimal slippage between the components during operation of the rotary indexing table 10.

The belt 48 is preferably constructed of poly-urethane with a helically wound steel tension member molded within the belt and nylon facing on the toothed side. A belt of such construction is a BRECCOFLEX Model H belt marketed by BRECCOFLEX Corp., One Industrial Way West, Building E-11, P.O. Box 829, Eatontown, N.J. 07724. The preferred belt exhibits minimal stretching, therefore resulting in improved indexing accuracy over the operational life of the belt.

The geared pulley 58 is positioned generally in the same plane as the dial 14. (See FIGS. 4 and 6) Idler bearings 60 rollingly engage the smooth side 52 of the belt 48 to assist in directing the belt 48 around the geared pulley 58. A stepper or servo motor 62 rotatably drives the pulley 58 to rotate the dial 14 via the belt 48. The dial 14 is preferably driven from the outer edge for improved dynamic performance. However, the dial 14 can also be driven from the inner edge. The servo motor 62 is rotatably controllable to very small angles of rotation and further provides a feed back signal indicative of motor rotation. The motor 62 is preferably mounted to the table 12 by an adjustable motor mount 64. A rotatable adjuster bolt 66 on the motor mount 64 radially moves the motor 62 to adjust belt tension. The drive assembly can be employed independently of the particular above desired table, dial and bearings for rotational motion of other assemblies not shown.

In an alternate embodiment, (not shown) teeth are machined into the outer edge 38 of the dial 14. A servo motor rotates a pinion meshing the teeth on the outer edge to rotate the dial. However, the geared outer edge is expensive to manufacture and subject to wear. Furthermore, the gear/pinion interface can exhibit backlash, leading to imprecision of the indexing positions. In addition, driving the dial 14 from a single gear/pinion interface places uneven radial forces on the dial that can result in further imprecision of the indexing positions.

In still a further embodiment, (not shown) a chain is wrapped around the outer edge of the dial to define gear teeth. Again, a servo motor rotating a pinion meshing with the chain rotates the dial. The use of a chain can be inefficient, requiring control of the outside diameter of the dial and precision in the chain length for a sufficiently tight wrap of the dial. The gear (chain) and driving pinion can exhibit the same backlash deficiencies of the gear and pinion embodiment.

Figure 8:
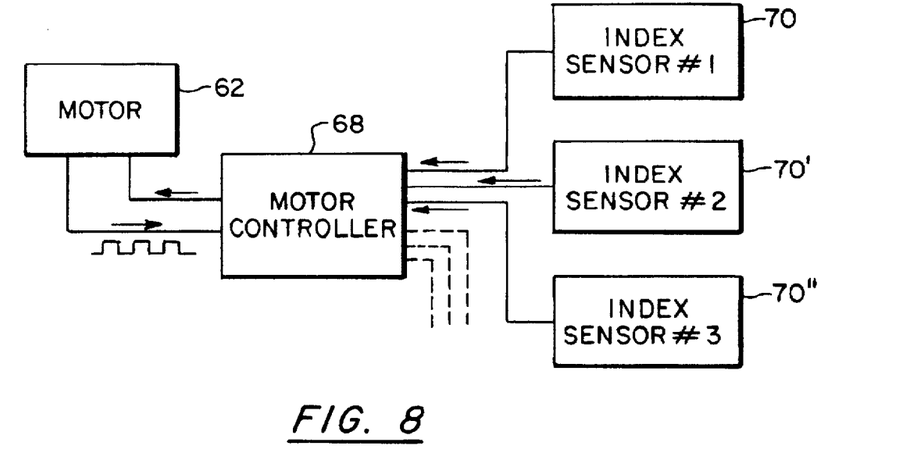
FIG. 8 is a schematic of the control system of the rotary indexing table of FIG. 1.

A motor controller 68, preferably a personal computer 69 having a monitor 71 and a keyboard 73, controls rotation of the motor 62 to provide indexing of the dial 14. (See FIG. 8) The motor controller 68 receives signals from at least two sources to determine the operation of the motor 62. First, an indexing assembly 70 indicates precisely, to less than a thousandth of an inch, the rotational location of the dial 14. Second, the servo motor 62 generates the feed-back signal of pulses indicating a precise rotation of the motor 62. From the rotation of the motor, the motor controller 68 can determine the distance the belt 48 has moved and therefore the degree of rotation of the dial 14. Due to slight variations in the manufacture of the dial 14, the belt 48, and other components of the rotary indexing table, the number of pulses indicating complete rotation of the dial must be empirically calibrated for each individual indexing table 10.

In the preferred embodiment, the indexing assembly 70 has a fixed indexing mark comprising an indexing post 72 extending orthogonally from the lower surface 26 of the dial 14 adjacent the inner edge 28. (See FIG. 4) A photo source 74 is positioned radially outward from the post 72 and mounted to the table surface 20. The photo source 74 emits a photo beam directed radially inward toward a photo detector 76 positioned on the table surface 20 within the dial opening 46. Therefore, as the indexing post 72 moves through a circular path, in at least one position the post 72 interrupts the photo beam. Interruption of the photo beam generates an index signal from the photo detector 74 to the motor controller 68 to indicate the rotational position of the dial 14. The motor controller 68 sets the initial position of the dial 14 from the index signal. In a preferred alternate embodiment, a proximity sensor can be employed to accurately sense the position of the indexing post 72. The indexing assembly 70 can alternately comprise a laser, mechanical switches contacting the post or other known precision position sensing apparatus. Furthermore, the indexing marks can alternately be openings machined in the dial 14, or other reference marks on the dial 14. The indexing post 72 can be further positioned adjacent the outer edge of the dial for improved accuracy. However, the difference between the radius of the inner edge and the outer edge is sufficiently small for larger dials so that the indexing post is preferably positioned adjacent the inner edge for improved access and compactness.

In operation, the motor controller 68 initiates operation of the motor 62 by accelerating the motor 62, and therefore, the dial 14 from a state of rest. The servo motor 62 has an associated amplifier and resolver. The resolver is rotated by the rotation of the motor and generates a resolver signal indicative of the motor rotation. The amplifier converts the resolver signal into a series of pulses indicative of motor rotation. As the motor 62 rotates, the motor 62 therefore generates a feed-back signal of a series of pulses that are counted by the motor controller 68 to determine the rotational distance moved by the motor 62 and therefore the dial 14. A number of pulses is initially determined empirically for one complete rotation of a particular dial 14. The total number of pulses is then divided by the number of index positions required for a certain operation. A predetermined number of pulses therefore indicates rotation of the dial 14 from first index position through a rotational cycle to a second index position. It should therefore be recognized that the number of index positions can be easily and rapidly changed by the motor controller 68 without requiring any mechanical changes of the rotary indexing table 10. Furthermore, the motor controller 68 can even reverse the direction of rotation of the dial 14 during a series of indexing cycles, and by summation continue to accurately index the dial 14.

In use, as the motor controller 68 approaches the count for the number of pulses for an index position, the motor controller 68 is programmed to decelerate the motor 62 and the dial 14 and bring the dial 14 to a smooth final stop at the precise index position determined by the specific number of pulses. It is generally preferred that the indexing cycle result in a smooth sinusoidal-type change in velocity of the dial 14 between index positions. The smooth acceleration and deceleration of the dial 14 therefore avoids abrupt changes in velocity that could lead to slippage between the belt 48 and the dial 14 from inertial effects. Furthermore, smooth transitions of the rotational velocity of the dial 14 decreases the potential for vibration and unnecessary forces on the drive assembly.

In one embodiment of the invention, the motor controller 68 controls the motor through an entire rotation of the dial having any number of indexing cycles and resets or calibrates the pulse count of the feed-back signal of the motor on receiving the index signal of the indexing assembly 70. Therefore, after each rotation of the dial 14, the motor controller 68 resets or calibrates to eliminate cumulative errors that could increase through multiple rotations of the dial 14. The motor controller 68 can also reset or calibrate after multiple rotations of the dial in order to decrease calibration time and therefore increase the cycle rate. After the reset or calibration, the motor controller redivides the new number of pulses indicative of a complete dial rotation by the number of indexing positions to recalculate the indexing positions.

In a further embodiment, where additional precision is required, the indexing assembly 70 has a plurality of index posts 72, preferably one index post 72 for each index position. In operation, the motor controller 68 initiates motion of the motor 62 and begins counting pulses. The motor controller 68 accelerates and decelerates the motor 62 until the total anticipated degree rotation is approached. However, the motor controller 68 continues to rotate the motor 62 until the indexing assembly 70 generates an index signal by sensing the particular indexing post 72 for a corresponding index position. The motor controller 68 stops motor rotation on reception of the index signal.

In an even further embodiment, wherein the motor controller 68 of the invention can be quickly and rapidly reprogrammed to delete or add indexing positions, a large plurality of index marks or posts 72 can be provided at all potential index positions. The motor controller 68 can be programmed to control the motor 62 based on receiving selective index signals from the indexing assembly and disregarding other index signals to therefore allow rapid and efficient changes in the number of index positions. The motor controller 68 can further control rotation of the dial 14 in either direction, therefore a series of indexing cycles can comprise the dial 14 changing direction or actuating small motions during a particular index cycle. Furthermore, the acceleration and deceleration of the dial 14 can be specifically controlled for maximum efficiency and improved cycle rate without loss of indexing accuracy.

The motor controller 68 can initiate each indexing cycle on reception of a start signal entered by an operator at the motor controller. The motor controller 68 is additionally programmable for automatically initiating indexing cycles after waiting a predetermined time period between indexing cycles. The indexing assembly 70 and motor controller 68 can also be employed to index conventional rotary indexing tables.

In a further embodiment of the invention, support columns 78 extend upward from the table surface 20 inside the dial opening 46 to support a circular upper housing or halo 80 over the table surface 20. Switches, valves and other components of the automated work station 11 are preferably positioned in the halo 80 for simplified access and maintenance. Furthermore, a monitor and keyboard support arm 82 is rotatably mounted to the top of the halo 80. A roller 84 on the arm 82 and in rolling contact with the flat upper surface, of the halo 80 provides support for the arm 82 projecting outward from the halo 80. Mounted at the distal end of the arm 82 is a frame 86 supporting the computer monitor 71 and keyboard 73 of the motor controller 68. Computer and power cables connecting the monitor 71 and the keyboard 73 to the computer 69 extend through the arm 82 and down into the halo 80. The cables then extend through the access opening 22 and into the base 16 where the computer 69 of the motor controller 68 is housed. The arm 82 is rotatable in a complete arc around the halo 80 to allow programming and control of the motor controller 68 from any position around the dial 14. This universal positioning facilitates efficient programming and maintenance of the rotary indexing table 10.

In another embodiment of the invention, vacuum can be provided to the upper work surface 24 of the dial 14. The vacuum can be employed to hold the workpieces 44 on the fixtures 42. Rings 88 of hard felt are positioned between the dial 14 and the table surface 20 and on either side of the thrust bearings 31, 33 to define a vacuum manifold 90 therebetween. The rings are preferably bonded to the table surface 20 and in sliding contact with the dial 14. (See FIG. 4) Air is evacuated from the vacuum manifold 90 by a port 92 in the table 12 connected to a vacuum pump 94. Openings 98 machined in the dial allow fixtures on the upper work surface 24 to use the vacuum for holding down workpieces 44 and other functions. Dams of hard felt can also be positioned radially across the vacuum manifold 90 to reduce or eliminate vacuum at particular work stations such as a take off work station. Alternately, pressurized air could instead be provided to the vacuum manifold 90 to provide pressurized air to the fixtures on the work surface.

In an even further embodiment, a commutator (not shown) can provide electrical energy to the dial. Electrically conducting rings, generally concentric with the dial, are positioned between the thrust bearings 31, 33. Electrical contacts extend downward from the lower surface 26 of the dial 14 to provide an electrical connection and therefore electrical energy to the dial 14.

While a preferred embodiment of the present invention has been illustrated and described in detail, it should be readily appreciated that many modifications and changes thereto are within the ability of those of ordinary skill in the art. Therefore, the appended claims are intended to cover any and all of such modifications which fall within the true spirit and scope of the invention.

I claim:

1. A rotary indexing table comprising:

a table having a table surface;

a rotatable dial positioned over said table, said dial having an upper surface and an opposite lower surface, said lower surface facing and generally parallel to said table surface, said dial further having an outer edge, a circular inner edge, and an axis of rotation centered within said inner edge;

first bearing means mounted to said table and contacting said inner edge for radially supporting the rotation of said dial on said table;

second bearing means for axially supporting said lower surface on said table surface for rotation of said dial over said table surface, said second bearing means including a plurality of concentric grooves in one of said lower surface and said table surface, said grooves having a center of curvature generally on said axis of rotation, and the other of said table surface and said lower surface defining a flat surface, and ball bearings in said grooves in contact with said flat surface of said other of said lower surface and said table surface permitting linear horizontal movement of said dial relative to said table; and drive means engaging said dial for indexing the rotation of said dial.

2. The rotary indexing table of claim 1 wherein said inner edge defines a bevel, said bevel oriented away from said table surface and said first bearing means comprises a plurality of bevelled rollers in contact with said bevel.

3. The rotary indexing table of claim 2 wherein said bevel is angled at about 75° from said table surface.

4. The rotary indexing table of claim 1 wherein said outer edge is circular and has a center of curvature on said axis of rotation.

5. The rotary indexing table of claim 1 wherein said drive means comprises a servo motor.

6. The rotary indexing table of claim 5 wherein said drive means further comprises:

a belt drivable by said servo motor, said belt in contact with substantially the entire of said outer edge of said dial.

7. The rotary indexing table of claim 6 wherein said servo motor drives a gear, and said belt defines teeth engageable with said gear and a longitudinal groove for engagement with the outer edge of the dial.

8. The rotary indexing table of claim 7 wherein said teeth extend radially inward over said upper surface and said lower surface.

9. The rotary indexing table of claim 1 further comprising sealing means including a plurality of concentric sealing rings between said table surface and said lower surface, said sealing rings, said table surface and said lower surface defining a vacuum manifold; and vacuum means for evacuating air from said vacuum manifold.

10. A rotary indexing table comprising:

a table having a table surface;

a rotatable dial positioned over said table, said dial having an upper surface and an opposite lower surface, said lower surface facing and generally parallel to said table surface, said dial further having and outer edge and a circular inner edge;

first bearing means mounted to said table surface and contacting said inner edge for radially supporting the rotation of said dial over said table, said dial defining an axis of rotation;

second bearing means for axially supporting said lower surface on said table surface for rotation of said dial on said table, said lower surface defining a bearing surface comprising concentric grooves and said table surface defining a generally flat surface, and ball bearings in said grooves in contact with said flat surface permitting linear horizontal movement of said dial relative to said table; and drive means engaging said outer edge for indexing the rotation of said dial.

11. The rotary indexing table of claim 10 further comprising an indexing mark on said dial and sensor means for sensing said indexing mark and generating a signal in response to said sensing; and control means for controlling said drive means in response to said signal.

12. The rotary indexing table of claim 11 wherein said sensor means comprises a photo source and a photo sensor.

13. The rotary indexing table of claim 11 wherein said indexing mark comprises a post mounted to said lower surface.

14. The rotary indexing table of claim 11 wherein said drive means comprises a servo motor.

15. The rotary indexing table of claim 14 wherein said servo motor generates a feed-back signal and said control means controls said motor in response to said feed-back signal.

16. The rotary indexing table of claim 11 wherein said indexing mark comprises indexing posts on said lower surface of said dial and said sensor means comprises a photo source and a photo sensor.

17. The rotary indexing table of claim 10 wherein said drive means comprises a motor and a belt in contact with substantially all of said outer edge and drivable by said motor.

18. The rotary indexing table of claim 17 wherein said motor has a toothed pulley, said belt defines teeth engagable with said toothed pulley, and a linear groove engagable to said outer edge.

19. A rotary indexing table comprising:

a table having a table surface;

a rotatable dial positioned over said table, said dial having an upper surface and an opposite lower surface, said lower surface facing and generally parallel to said table surface, said dial further having an outer edge and a circular inner edge;

first bearing means mounted to said table surface and contacting said inner edge for rotation of said dial on said table, said dial defining an axis of rotation;

second bearing means for axially supporting said lower surface on said table surface for rotation of said dial over said table;

drive means for rotating said dial;

an indexing mark on said dial;

sensor means for sensing the position of said indexing mark and generating a signal in response to said sensing; and control means for controlling said drive means in response to said signal of said sensor means.

20. The rotary indexing table of claim 19 wherein said indexing mark comprises an indexing post extending from said lower surface and said sensor means comprises a photo source and a photo sensor for sensing said indexing post.

21. The rotary indexing table of claim 19 wherein said table surface is defined by a single metal sheet.

22. The rotary indexing table of claim 19 further comprising an automated work station mounted to said table surface, said table surface extending beyond said outer edge and said work station straddling said dial.

23. The rotary indexing table of claim 19 wherein said drive means comprises a geared pulley and a toothed belt engaging said outer edge and drivable by said pulley.

24. The rotary indexing table of claim 19 wherein said drive means comprises a motor, said motor having signal means for generating a feed-back signal indicative of motor rotation to said control means, and said control means controls said drive means in response to said feed-back signal.

25. The rotary indexing table of claim 24 wherein said feed-back signal comprises a series of pulses.

* * * * *